United States Patent
van Boxtel et al.

(10) Patent No.: US 11,479,100 B2
(45) Date of Patent: Oct. 25, 2022

(54) OPEN ROOF CONSTRUCTION FOR A VEHICLE

(71) Applicant: Inalfa Roof Systems Group B.V., Oostrum (NL)

(72) Inventors: Eduardus Christianus Henricus van Boxtel, Zeeland (NL); Jur Johannes Maria Custers, Lottum (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 13 days.

(21) Appl. No.: 17/181,817

(22) Filed: Feb. 22, 2021

(65) Prior Publication Data
US 2021/0260977 A1 Aug. 26, 2021

(30) Foreign Application Priority Data
Feb. 24, 2020 (EP) .................................. 20159054

(51) Int. Cl.
*B60J 10/00* (2016.01)
*B60J 10/90* (2016.01)
(Continued)

(52) U.S. Cl.
CPC ................. *B60J 10/90* (2016.02); *B60J 7/04* (2013.01); *B60J 10/18* (2016.02); *B60J 10/36* (2016.02); *B60J 10/82* (2016.02)

(58) Field of Classification Search
CPC ... B60J 10/18; B60J 10/36; B60J 10/30; B60J 10/82
(Continued)

(56) References Cited

U.S. PATENT DOCUMENTS 4,368,915 A 1/1983 Torii
4,416,487 A 11/1983 Hirotani et al.
(Continued)

FOREIGN PATENT DOCUMENTS

DE 10226771 A1 1/2004
DE 202012012291 U1 8/2013
(Continued)

OTHER PUBLICATIONS

European Search Report for corresponding European Patent Application No. 120159054.4, dated Sep. 3, 2020.

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle having a roof opening in a fixed roof has a roof edge defining the roof opening and protruding in a downward direction. The open roof construction comprises a stationary part and at least one panel for at least closing the roof opening. The stationary part is provided with sealing assembly comprising a first seal part forming a seal towards the panel, and a second seal part capable of sealing the stationary part against the roof edge. The sealing assembly is provided with an attachment structure protruding from the first seal part and the second seal part and attaching the sealing assembly to the stationary part. A reinforcement member is integrated in the sealing assembly and extends at least between the first and second seal parts. The reinforcement member forms an integral part of the attachment structure of the sealing assembly.

18 Claims, 6 Drawing Sheets

(51) Int. Cl.
  *B60J 10/18* (2016.01)
  *B60J 10/36* (2016.01)
  *B60J 7/04* (2006.01)
  *B60J 10/82* (2016.01)

(58) Field of Classification Search
  USPC ............ 296/216.06–216.9; 49/479.1, 484.1, 49/489.1
  See application file for complete search history.

(56) References Cited

U.S. PATENT DOCUMENTS

| | | |
|---|---|---|
| 5,100,197 A | 3/1992 | Ichinose et al. |
| 5,988,736 A | 11/1999 | Kralik et al. |
| 6,364,407 B1 | 4/2002 | Raisch et al. |
| 6,485,092 B2 | 11/2002 | Iimori et al. |
| 8,966,824 B2 | 3/2015 | Gladfelter |
| 9,308,804 B2 | 4/2016 | Roeder et al. |
| 9,981,539 B1 | 5/2018 | Gill et al. |
| 9,987,911 B2 | 6/2018 | Allali |
| 2002/0070586 A1 | 6/2002 | Kohout et al. |
| 2017/0240035 A1 | 8/2017 | Allali |

FOREIGN PATENT DOCUMENTS

| | | | |
|---|---|---|---|
| EP | 1571027 A1 | | 9/2005 |
| EP | 3219530 A2 | | 9/2017 |
| FR | 2509825 A1 | * | 7/1981 |

\* cited by examiner

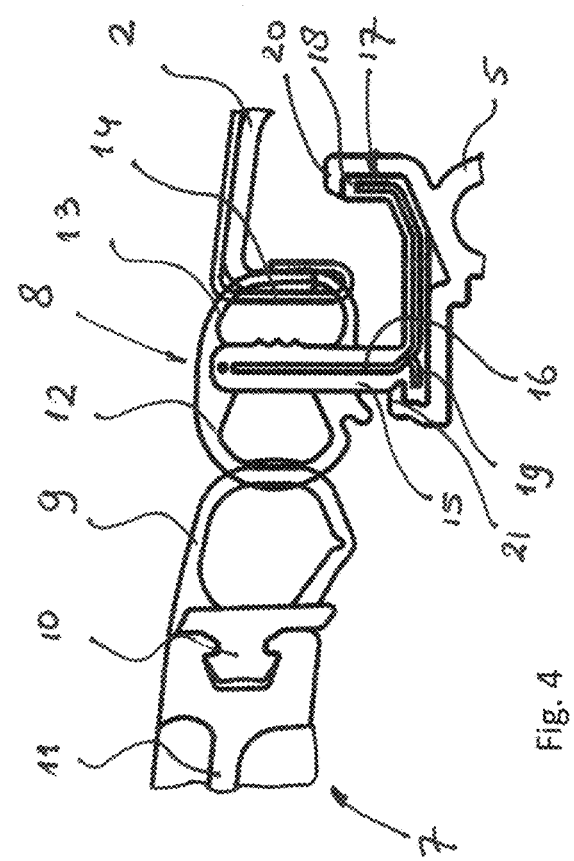
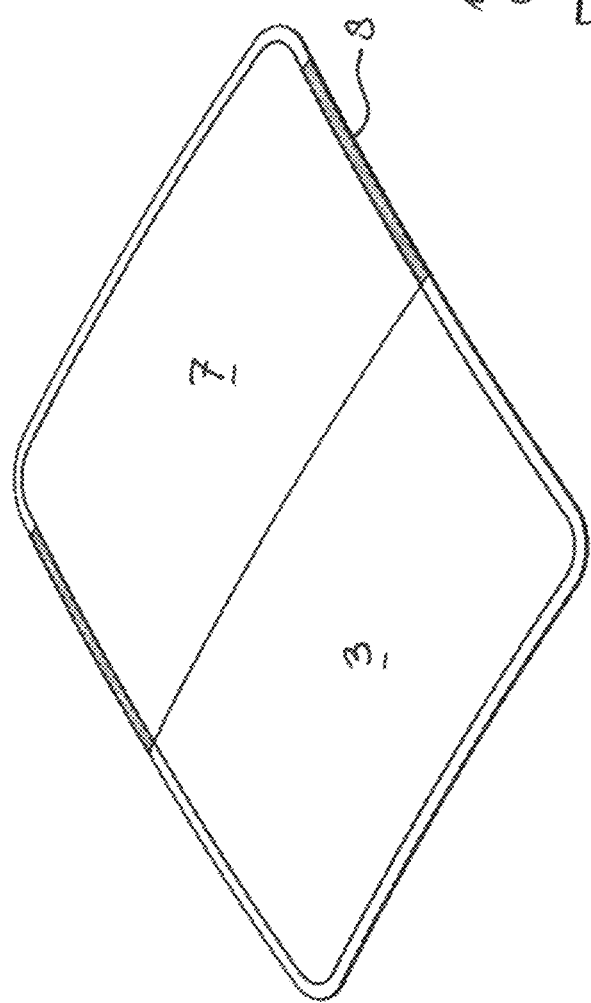
Fig. 3
Fig. 4

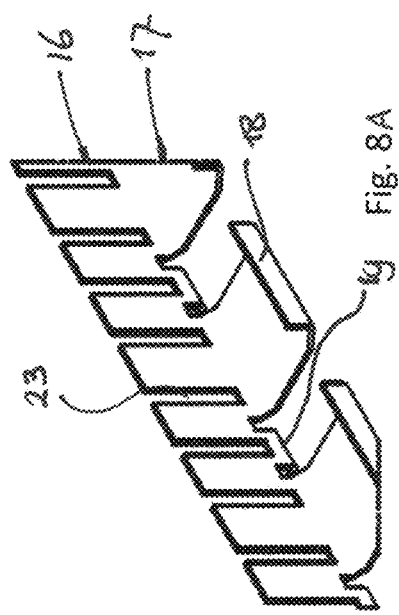
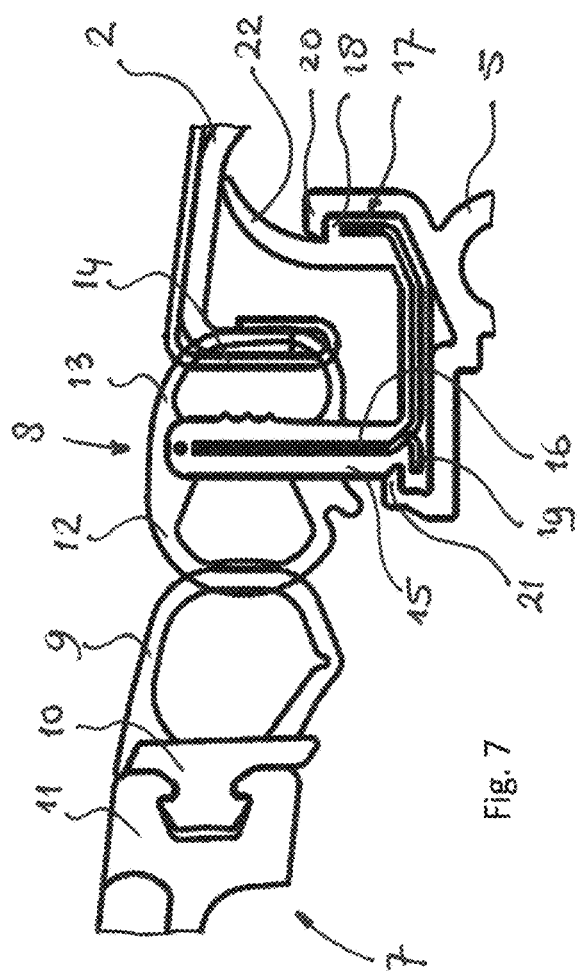
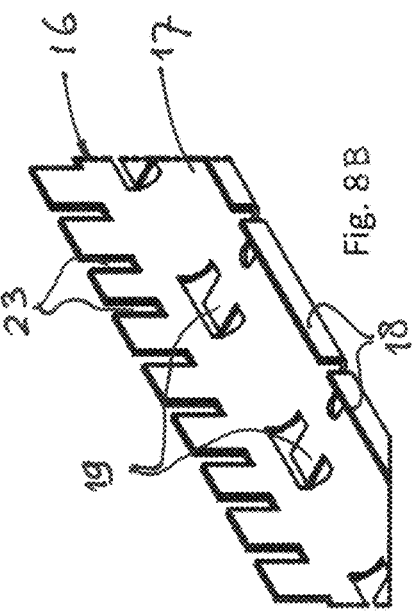

OPEN ROOF CONSTRUCTION FOR A VEHICLE

BACKGROUND

The discussion below is merely provided for general background information and is not intended to be used as an aid in determining the scope of the claimed subject matter.

The invention relates to an open roof construction for a vehicle.

An open roof construction is known in the art, for example from EP 3 219 530 A2. The sealing assembly of this prior art open roof construction is provided with a third sealing part capable of sealing a stationary part against a lower part of a roof edge defining a roof opening. The attachment structure is formed at a lower side of the third seal part.

As the third seal is deformable, the hold of the first and second seal is not very stable.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction for a vehicle having a roof opening in a fixed roof has a roof edge defining the roof opening and protruding in a downward direction. The open roof construction comprises a stationary part and at least one panel for at least closing the roof opening. The stationary part is provided with sealing assembly comprising a first seal part forming a seal towards the panel, and a second seal part capable of sealing the stationary part against the roof edge. The sealing assembly is provided with an attachment structure protruding from the first seal part and the second seal part and attaching the sealing assembly to the stationary part. A reinforcement member is integrated in the sealing assembly and extends at least between the first and second seal parts. The reinforcement member forms an integral part of the attachment structure of the sealing assembly.

Due to the reinforcement member and the attachment structure being integrated the hold of the first and second seal part with respect to the stationary part is very stable and accurate. As the reinforcement member is integrated in the sealing assembly, the dimension of the sealing assembly in Y-direction (lateral) can be kept to a minimum, while the protruding attachment structure there is no need for a vertical flange of the stationary part, which facilitates processing of the stationary part. For example, if the stationary part is an extruded part which must be bent to conform it to a curvature of the fixed roof, a vertical flange increases the required bending forces and increases the risk of scrap due to tearing for example.

Preferably, the attachment structure includes hook and clip members and the stationary part includes counter parts to lock the hook and clip members to the stationary part.

This will lead to a very secure and precise attachment and positioning of the sealing assembly, especially if the hook and clip members are positioned at a distance from each other and are securely clamped between the counter parts.

This is for example possible if the reinforcement member extends mainly perpendicularly with respect to the horizontal and the attachment structure exhibits a horizontal extent, in particular one of the hook and clip members may be positioned near the bottom of the reinforcement member and the other of the hook and clip members may be positioned at a distance on the free end of the attachment structure.

The attachment structure is then locked close to the first and second seal parts while the horizontal extension of the attachment structure provides a stable base for the sealing assembly.

The hook member may be at the free end of the attachment structure and the clip member may be at the bottom of the reinforcement member, in which the free end of the attachment structure may be positioned at an upward portion thereof.

In an embodiment, the stationary part is provided with a hook and/or recess as counter parts to accommodate each of the hook and clip members.

The attachment structure of the sealing assembly is preferably attached to a portion of a guide rail of the stationary part. This guide rail is generally an extrusion profile which has a large design freedom and accurate dimensioning.

The reinforcement member/attachment structure is preferably made mainly from hard rubber, plastic or metal, in particular steel.

In a particular embodiment, the reinforcement member and/or the attachment structure is interrupted along the length to allow the reinforcement member to be adapted to any curve of the stationary part.

The attachment structure may be provided with a third seal part adapted to seal against the lower side of the fixed roof.

In an embodiment, the panel is movably supported by an operating mechanism, guided in a guide rail of the stationary part, extending along at least a longitudinal side of the roof opening, the panel being movable in vertical and longitudinal directions with respect to the roof opening in order to selectively open and close the roof opening.

In another embodiment, the panel is a fixed panel attacked to the stationary part to permanently close at least a part of the roof opening.

The fixed panel may be provided with a panel seal cooperating with the first seal part of the sealing assembly and either sealing a gap between the fixed panel and the fixed roof and/or allowing a support of the movable panel to pass through the gap by a deformation of at least one of the panel seal and first sealing part.

BRIEF DESCRIPTION OF THE DRAWINGS

Aspects of the invention will further be explained with reference to the drawings showing embodiments of the open roof construction by way of example.

FIG. 3 is a perspective view of the two panels of the open roof construction of FIG. 2 with indication of the position of the sealing assembly.

FIG. 4 is an enlarged sectional view according to the line IV-IV in FIG. 1.

FIG. 7 is a sectional view corresponding to that of FIG. 4, but showing a further embodiment of the sealing assembly.

FIGS. 8A and 8B are perspective views of a part of a reinforcement member of the sealing assembly, in which the reinforcement of FIG. 8A is the one as shown in FIG. 7.

DETAILED DESCRIPTION OF THE ILLUSTRATIVE EMBODIMENTS

Figure 1:
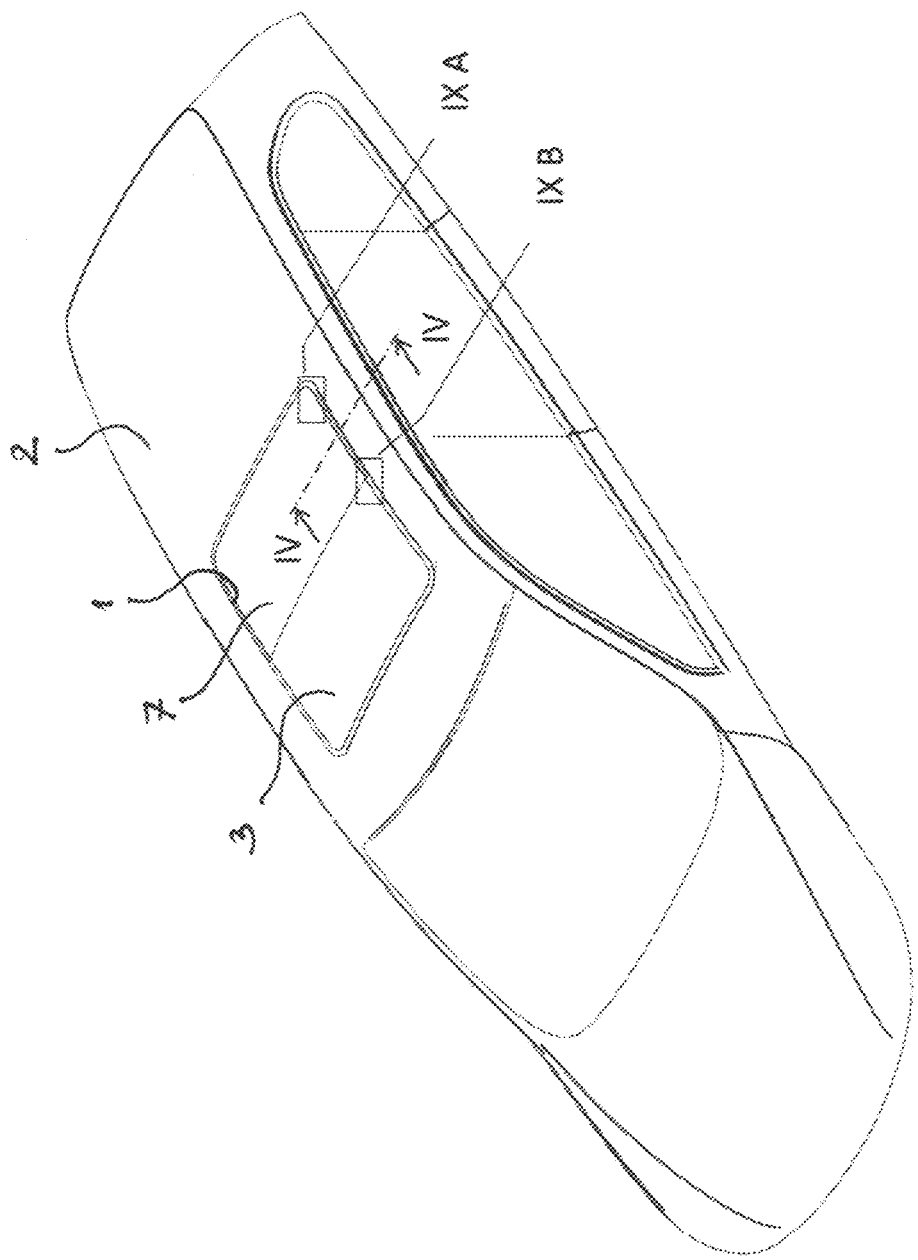
FIG. 1 is an isometric perspective view of the upper part of a vehicle in which an open roof construction is provided.
Figure 2:
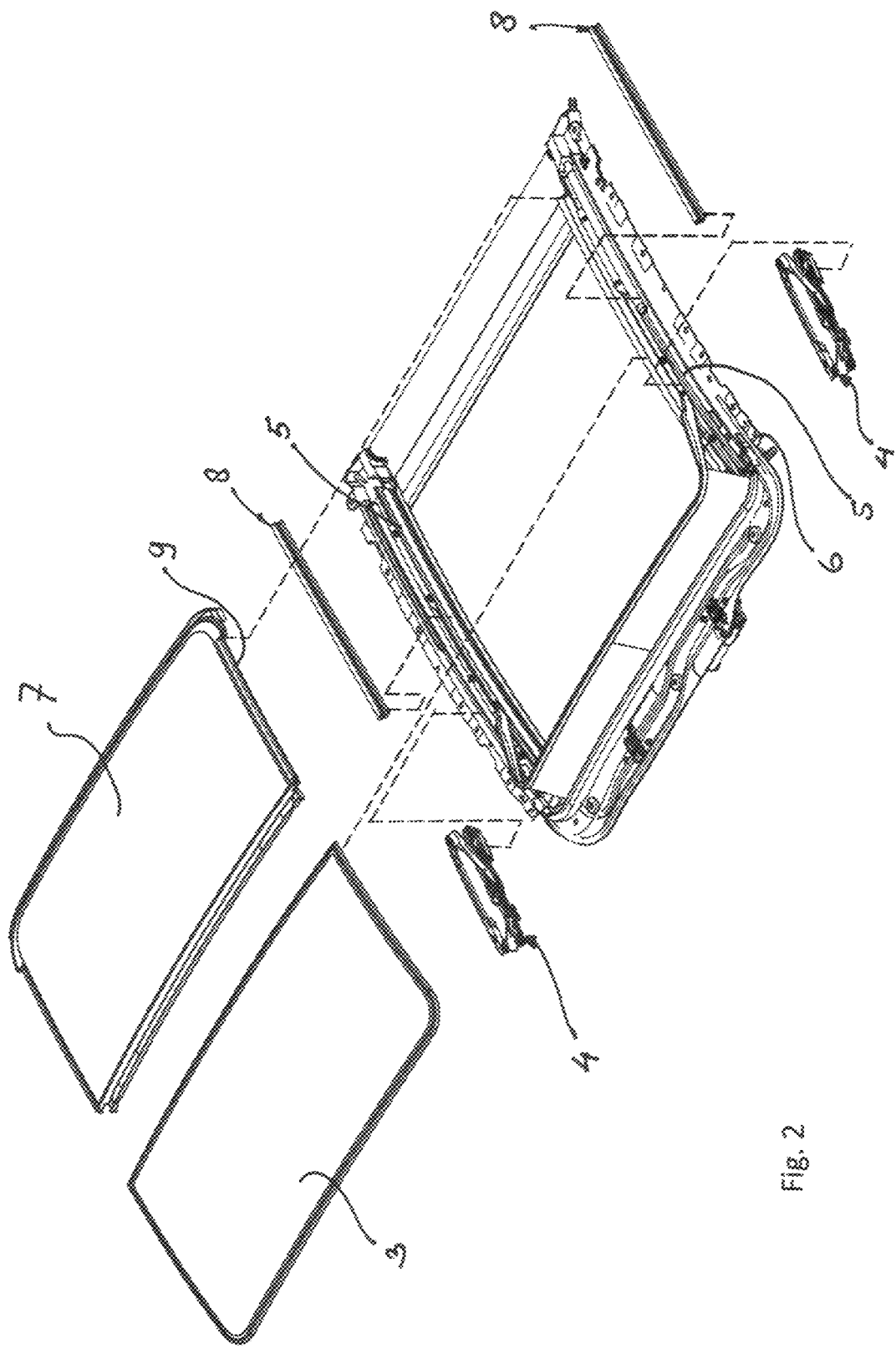
FIG. 2 is an exploded view of the main parts of the open roof construction of FIG. 1 in isolation from the vehicle body.

FIG. 1 shows a vehicle, in this case a passenger car but could e.g. also be a utility vehicle, having a roof opening 1 in a fixed roof 2 thereof to be provided with an open roof construction comprising at least one panel 3. The panel 3 is movable for at least partly opening and/or closing the roof opening 1. The panel 3 is movably supported by an operating mechanism 4 (only schematically shown in FIG. 2, but known in the art). The operating mechanism 4 is guided in a guide rail 5 on a frame 6, forming the stationary part, extending along at least one, but here two longitudinal sides of roof opening 1 (FIG. 2). The panel 3 is movable in vertical and longitudinal directions with respect to the roof opening 1. The open roof construction can be of the type whereby the panel 3 slides to an open position at the exterior side of the vehicle body, but it can also be of the type whereby the panel 3 slides to an open position at the interior side of the body.

In the embodiment shown, there is a second panel 7 which is positioned behind panel 3 (when in its closed position) and which in this case is a fixed panel attached to stationary part 4 and permanently closing the respective part of roof opening 1. Panel 3 will be at least partly above panel 7 when in its open position. Panel 7 may also be a movable panel, or may be used as a fixed panel alone, thus permanently covering the whole roof opening 1 and letting light in, not air, at least not by opening it.

FIG. 2 shows the open roof construction in an exploded view, showing panels 3, 7, frame 6 and related parts. Here a sealing assembly 8 is shown which in said view extends along a longitudinal side of the roof opening 1 (along a main part of the longitudinal side edge of panel 7, see also FIG. 3).

In FIG. 4 sealing assembly 8 is shown in more detail. The sealing assembly 8 takes care of the seal between frame 6 and fixed roof 2 and also the seal between panel 7 and frame 6/fixed roof 2. Panel 4 is provided with panel seal 9 which is a bulb seal comprising a mounting member 10 fixing panel seal 9 to an encapsulation 11 around the glass of panel 7. Panel seal 9 cooperates with a first seal part 12 of sealing assembly 8, which is also a bulb seal, and together close a gap between panel 7 and frame 6. Panel seal 9 and first seal part 12 are located above respective guide rail 5 and allow a support of the operating mechanism 4 of panel 3 to pass through the gap that is normally closed by panel seal 9 and first seal part 12 by deformation of panel seal 9 and/or first seal part 12.

Sealing assembly 8 comprises a second seal part 13 also formed as a bulb seal and providing a seal between frame 6 and a vertical edge 14 of fixed roof 2 defining roof opening 1. First and second seal parts 12, 13 are positioned on opposite sides of an upright wall part 15 of sealing assembly 8. This upright wall part 15 includes a reinforcement member 16 providing rigidity to sealing assembly 8 and forming an integral part of an attachment structure 17, in one embodiment formed of a single unitary body, capable of accurately and rigidly attaching sealing assembly 8 to the stationary part, in this case guide rail 5 on frame 6. The attachment structure 17 and reinforcement member may be made from steel, hard rubber or the like, while the softer rubber of the seal parts 12, 13 and any cover may be molded thereon. Reinforcement 16 thus extends between seal parts 12, 13 and below in order to extend to attachment structure 17.

Attachment structure 17 having a horizontal extent or dimension includes hook and clip members 18, 19 and guide rail 5 includes counter parts 20, 21 to lock the hook and clip members to guide rail 5. As mentioned above reinforcement member 16 extends upright, in this case mainly perpendicularly with respect to the horizontal and attachment structure 17 exhibits mainly a horizontal extension. The hook member 18 is positioned at a free end of attachment structure 17 spaced from the reinforcement member 16, while clip member 19 is positioned near the bottom of reinforcement member 16, i.e. at the opposite end of attachment structure 17. The free end of attachment structure 17 is positioned at an upward portion thereof and hook member 18 can be hooked below a horizontal hook of counterpart 20. Opposite clip member 19 extending substantially horizontally can be clipped below a horizontal hook of counterpart 21 on guide rail 5. Counterparts 20, 21 form the upper walls of a gutter-like part of guide rail 5 acting as a drain for any water leaking between second seal part 13 and edge 14 of fixed roof 2. Counterparts 20, 21 can also be formed by recesses in guide rail 5.

Figure 5:
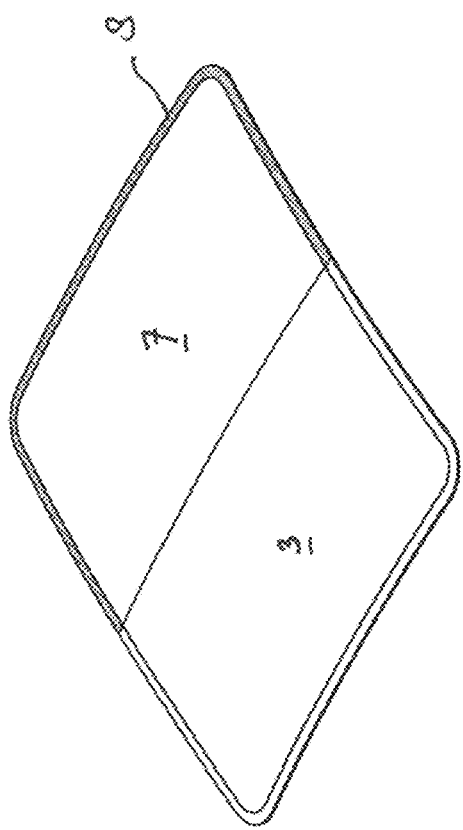
FIGS. 5 and 6 are views corresponding to that of FIG. 3, but showing more extended embodiments of the sealing assembly.
Figure 6:
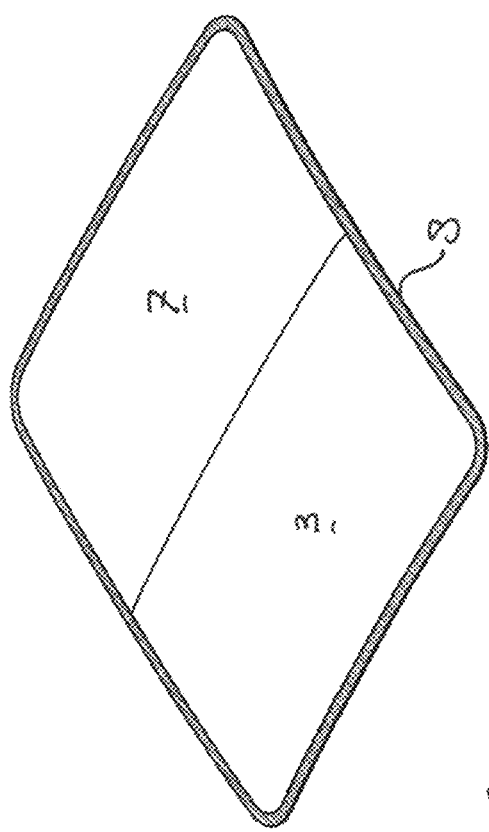

FIGS. 5 and 6 show that sealing assembly 8 (the hatched part) can have a larger extent. In FIG. 4 sealing assembly 8 is provided along the complete outer circumference at the rear and side edges of second panel 7, where sealing assembly 8 provides a seal between second panel 7 and edge 14 of fixed roof 2. Panel 9 may be provided along the length of sealing assembly 8, but it is also possible that first seal part 12 of sealing assembly 8 directly seals to encapsulation 11 of second panel 7. In FIG. 6, sealing assembly 8 is provided around the whole inner circumference of roof opening 1, providing a seal to outer circumference of the assembly of panels 3 and 7. Panel 3 may or may not have an additional panel seal to first seal part 12 of sealing assembly 8. Sealing assembly 8 may be the same around the whole circumference. It will be attached to guide rails 5 along the longitudinal sides and attached to similar counterparts on transverse beams along the transverse sides of roof opening 1.

FIG. 7 shows a second embodiment of sealing assembly 8. It includes a third seal part 22. It is positioned near the free end of attachment structure 17 (next to hook member 18) and includes a lip seal the free end of which sealing against the lower side of fixed roof 2. The remainder of sealing assembly 8 is equal to that of FIG. 4.

FIG. 8A shows reinforcement 16 and attachment structure 17 of sealing assembly 8 of FIG. 4 separately. Upright reinforcement member 16 is provided with vertical grooves open at and extending from the upper side of reinforcement member 16. This allows reinforcement member 16 to be bent with less bending force in order to adapt sealing assembly 8 and its reinforcement member 16 and attachment structure 17 to any curvature of guide rail 5 around a horizontal transverse axis. It is also shown in FIG. 8A that hook members 18 and clip members 19 are offset along the length of sealing assembly 8. This also allows sealing assembly 8 to be bent with less force around a vertical axis in the corners of panels 3, 7 in the embodiments of FIGS. 5, 6.

FIG. 8B shows a second embodiment of reinforcement 16 and attachment structure 17 of sealing assembly 8. The interruptions between the parts of hook members 18 are now smaller and the interrupting grooves shorter. Clip members 19 are longer for better bendability.

Figure 9A:
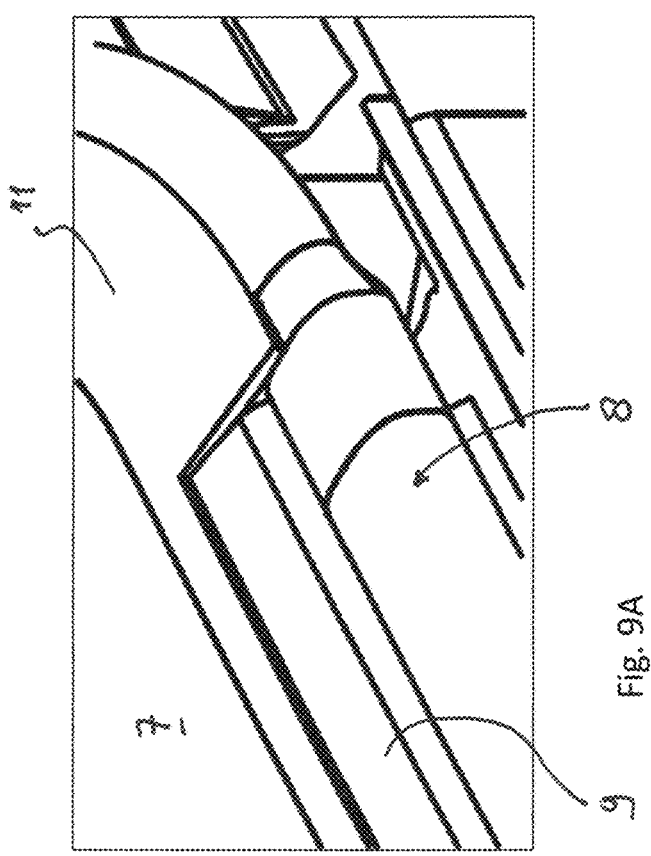
FIGS. 9A and 9B are enlarged views of details IXA and IXB in FIG. 1, respectively.

FIG. 9A shows the rear end of sealing assembly 8 and panel seal 9 in FIG. 2, 3. Encapsulation 11 of second panel 7 becomes broader behind panel seal 9 and sealing assembly 8 smaller. It may include a single seal attached to encapsulation 11 and sealing against the edge 14 of the roof opening 1. A soft rubber molding piece covers the transition from sealing assembly 8 to the panel seal.

Figure 9B:
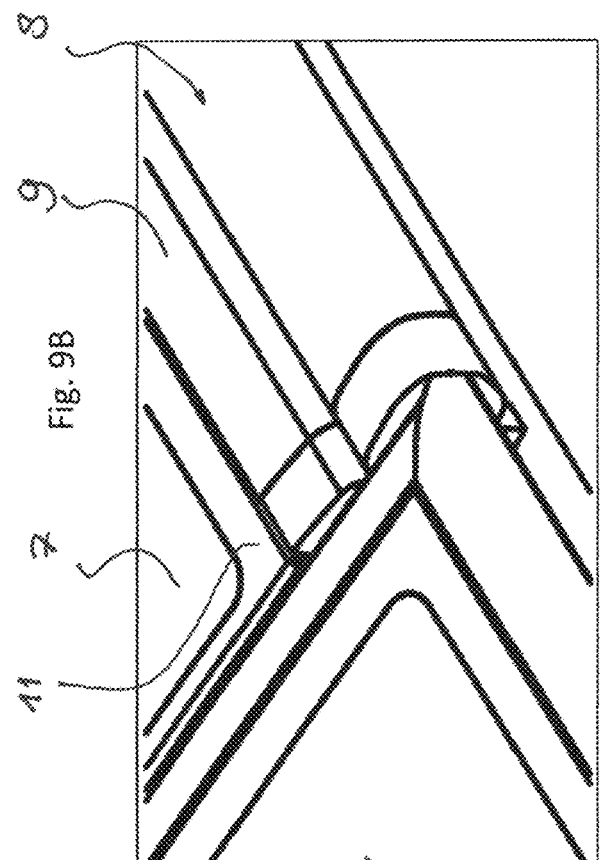

In FIG. 9B the front end of sealing assembly 8 and panel seal 9 is shown. They end together with the front end of second panel 7. The sealing assembly 8 and seal may be closed by a rubber molding piece.

From the foregoing it will be clear that the invention provides a sealing assembly in an open roof construction capable of providing an accurate and stable position and therefore sealing quality when built into a vehicle.

The invention is not limited to the embodiments shown in the drawings and described above, which can be varied in different manners within the scope as defined by the appending claims. Aspects of the various embodiments can be used in other combinations.

What is claimed is:

1. An open roof construction for a vehicle having a roof opening in a fixed roof, the fixed roof having a roof edge defining the roof opening and protruding in a downward direction, the open roof construction comprising:
   at least one panel configured to at least close the roof opening; and
   a stationary part, the stationary part being provided with a sealing assembly comprising a first seal part configured to form a seal towards the at least one panel, and a second seal part configured to seal the stationary part against the roof edge of the fixed roof, the sealing assembly being provided with an attachment structure protruding from the first seal part and the second seal part and configured to attach the sealing assembly to the stationary part and with a reinforcement member integrated in the sealing assembly and extending at least between the first seal part and the second seal part, wherein the reinforcement member forms an integral part of the attachment structure of the sealing assembly, and wherein the attachment structure includes hook and clip members and the stationary part includes counterparts to lock the hook and clip members to the stationary part.

2. The open roof construction according to claim 1, wherein the reinforcement member extends mainly perpendicularly with respect to a horizontal and the attachment structure exhibits a horizontal extent.

3. The open roof construction according to claim 2, wherein one of the hook and clip members is positioned near a bottom of the reinforcement member and the other of the hook and clip members is positioned at a free end of the attachment structure.

4. The open roof construction according to claim 3, wherein the hook member is at the free end of the attachment structure and the clip member is at the bottom of the reinforcement member.

5. The open roof construction according to claim 3, wherein the free end of the attachment structure is positioned at an upward portion thereof.

6. The open roof construction of claim 3, wherein the stationary part is provided with a hook and/or recess as counterparts to accommodate each of the hook and clip members.

7. The open roof construction according to claim 1, wherein the attachment structure of the sealing assembly is attached to a portion of a guide rail on the stationary part.

8. The open roof construction according to claim 1, wherein the reinforcement member and the attachment structure are made mainly from hard rubber, plastic or metal.

9. The open roof construction according to claim 1, wherein the reinforcement member and the attachment structure are interrupted along a length to allow the reinforcement member to be adapted to any curve of the stationary part.

10. The open roof construction according to claim 1, wherein the attachment structure is provided with a third seal part configured to seal against a lower side of the fixed roof.

11. The open roof construction according to claim 1, wherein the at least one panel is a movable panel movably supported by an operating mechanism, guided in a guide rail of the stationary part, extending along at least a longitudinal side of the roof opening, the panel being movable in vertical and longitudinal directions with respect to the roof opening in order to selectively open and close the roof opening.

12. The open roof construction according to claim 1, wherein the at least one panel is a fixed panel attached to the stationary part to permanently close at least a part of the roof opening.

13. The open roof construction according to claim 12, wherein the fixed panel is provided with a panel seal cooperating with the first seal part of the sealing assembly and sealing a gap between the fixed panel and the fixed roof.

14. The open roof construction according to claim 11, wherein the at least one panel is provided with a panel seal cooperating with the first seal part of the sealing assembly and allowing a support of the movable panel to pass through a gap by a deformation of at least one of the panel seal and the first seal part.

15. The open roof construction according to claim 1, wherein the at least one panel comprises:
   a fixed panel attached to the stationary part to permanently close a part of the roof opening, wherein the fixed panel is provided with a panel seal cooperating with the first seal part of the sealing assembly and sealing a gap between the fixed panel and the fixed roof; and
   a movable panel movably supported by an operating mechanism, guided in a guide rail of the stationary part, extending along at least a longitudinal side of the roof opening, the panel being movable in vertical and longitudinal directions with respect to the roof opening in order to selectively open and close another part of the roof opening, wherein a support of the movable panel passes through the gap by a deformation of at least one of the panel seal and the first sealing part.

16. The open roof construction according to claim 1, wherein the reinforcement member is interrupted along a length to allow the reinforcement member to be adapted to any curve of the stationary part.

17. The open roof construction according to claim 1, wherein the attachment structure is interrupted along a length to allow the reinforcement member to be adapted to any curve of the stationary part.

18. The open roof construction according to claim 1, wherein one of the hook and clip members is positioned near a bottom of the reinforcement member and the other of the hook and clip members is positioned at a free end of the attachment structure.

* * * * *